United States Patent [19]

Muller

[11] Patent Number: 4,721,852
[45] Date of Patent: Jan. 26, 1988

[54] LASER-WARNING DEVICE FOR MILITARY VEHICLES

[75] Inventor: Gerhard Muller, Aalen-Wasseralfingen, Fed. Rep. of Germany

[73] Assignee: Carl-Zeiss-Stiftung, Heidenheim/Brenz, Oberkochen, Fed. Rep. of Germany

[21] Appl. No.: 810,750

[22] Filed: Dec. 19, 1985

[30] Foreign Application Priority Data

Dec. 20, 1984 [DE] Fed. Rep. of Germany ....... 3446464

[51] Int. Cl.[4] .............................................. G01J 5/08
[52] U.S. Cl. .................... 250/227; 250/483.1
[58] Field of Search ............... 250/227, 483.1, 488.1, 250/551, 203, 232; 356/141, 152; 180/167; 350/96.18

[56] References Cited

U.S. PATENT DOCUMENTS

| | | | |
|---|---|---|---|
| 3,161,375 | 12/1964 | Ruhge | 250/203 R |
| 3,203,305 | 8/1965 | Fairbanks | 250/203 R |
| 3,614,025 | 9/1971 | Maillet | 250/203 R |
| 4,277,170 | 7/1981 | Miles | 350/96.18 |
| 4,467,208 | 8/1984 | Muller et al. | 250/227 |

FOREIGN PATENT DOCUMENTS

| | | |
|---|---|---|
| 0021887 | 1/1981 | European Pat. Off. . |
| 3119570A1 | 12/1982 | Fed. Rep. of Germany . |
| 7228073 | 3/1974 | France . |
| 81/03066 | 10/1981 | PCT Int'l Appl. . |

*Primary Examiner*—Edward P. Westin
*Assistant Examiner*—Charles F. Wieland
*Attorney, Agent, or Firm*—Hopgood, Calimafde, Kalil, Blaustein & Judlowe

[57] ABSTRACT

A passive collector/detector system is described for automatic response to laser range-finder radiation, the response being with capability to determine the general direction from which the range-finder radiation is incident.

12 Claims, 5 Drawing Figures

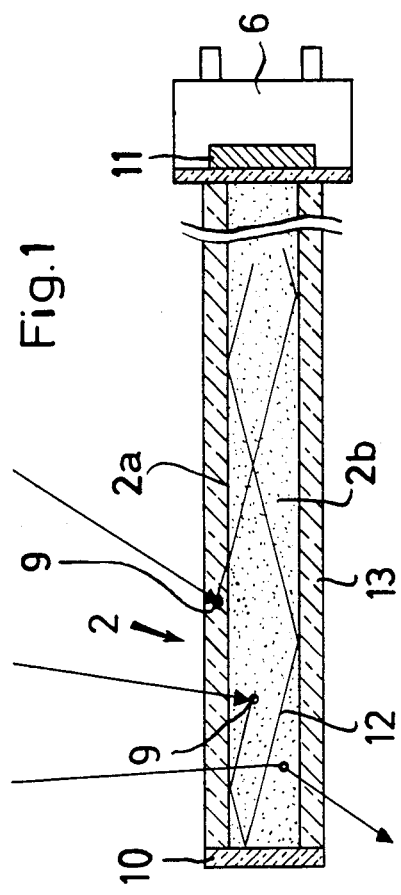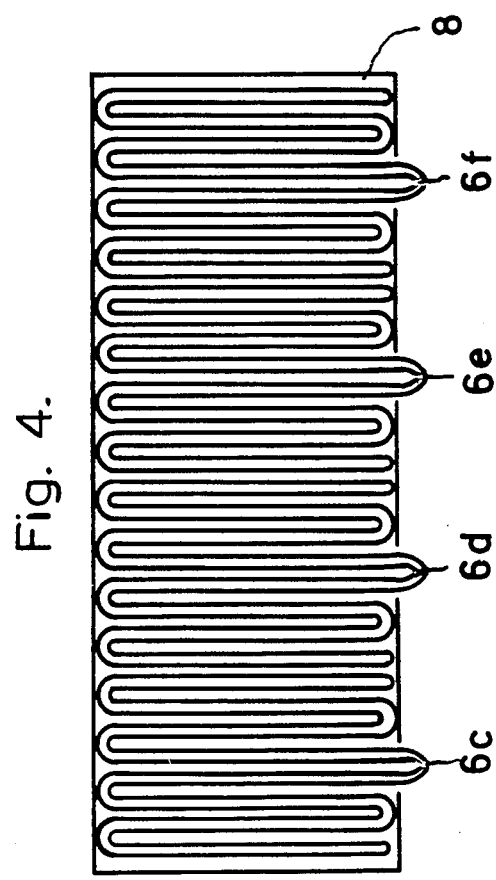

LASER-WARNING DEVICE FOR MILITARY VEHICLES

BACKGROUND OF THE INVENTION

The present invention relates to a passive device for indicating the incidence of electromagnetic radiation, as when a military vehicle is being sighted by an enemy laser-range finder.

In military engineering, enemy objects are measured with laser range finders in order to assure high accuracy of fire on the first firing. Such range finders operate in the near infrared (ruby laser at 694 nm, YAG laser at 1060 nm, or erbium laser at 1566 nm), or in the medium infrared ($CO_2$ laser at 10.6 $\mu$m).

The object of the present invention is to provide a passive means of warning to the driver of a military vehicle when his vehicle is being sighted by an enemy laser-range finder and, in this connection, to give him at least a general indication of the direction from which his vehicle is being sighted.

In U.S. Pat. No. 4,467,208, radiation detectors are disclosed as indicators of combustion or ignition processes and for the contact-less transfer of light signals between two relatively moving parts, the particular emphasis being on development of detector response to radiation in the ultraviolet region. These known detectors rely on a collector in the form of a light-guide fiber wound on a support, wherein the fiber has a core zone and an outer zone (cladding) of differing refractive index, and wherein the core material fluoresces when excited by ultraviolet radiation; the fluroescent light is conducted along the core to detector means at one or both ends of the core. These detectors are not suited to the above-stated object, but it is another object of the present invention to adapt and utilize some of the principles of said patent disclosure, in order to meet the directional and wavelength-response requirements for passive detection of a hostile laser sighting.

BRIEF STATEMENT OF THE INVENTION

The invention achieves the above-stated objects in generally the manner described in said patent, by providing, as an externally mounted vehicle accessory, a wound configuration of elongate light-guide fibers, wherein dispersion centers in the fibers are disposed to couple into the fibers a sufficient percentage of orthogonally incident laser-range finder radiation. Since such range finders operate with relatively great intensity of pulse output, a very slight coupling efficiency is sufficient to achieve the desired effect. The cladding of the fiber core is generally transparent to the involved infrared region and is substantially opaque to visible light, thereby avoiding external indication of fluorescent action within the core, and plural fibers, each with at least one separate detector element, are separately wound and disposed to achieve direction-finding response.

In preferred embodiments of the invention, the support for the light-guide fibers is of spherical or cylindrical shape. And by segmenting this support, as into two hemi-spheres or two semi-cylinders, and by mounting at least two such devices on the vehicle, a rough direction-finding capability is possible.

The invention has the advantage of being totally passive, in that detector-output alone is monitored through suitable amplifier/indicator means on the vehicle, and in that the laser radiation is more than sufficient to activate the device.

DETAILED DESCRIPTION

Several illustrative embodiments of the invention will be described in detail, in conjunction with the accompanying drawings, in which:

FIG. 1 is a fragmentary view in longitudinal section, diagrammatically showing basic elements of a sensor as used in a warning device of the invention;

FIG. 4 is a diagrammatic showing of a third embodiment, the showing being a flattened development of wound fibers for application to successive quadrants of a cylindrical support.

Figure 2:
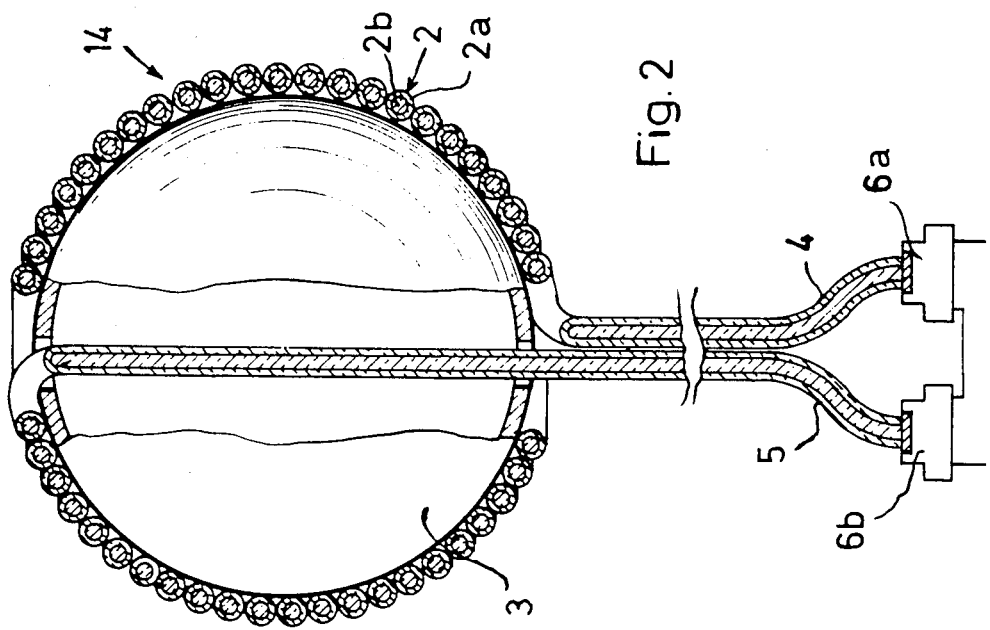
FIGS. 2 and 3 are similar views of separate embodiments, applied to spherical supports and respectively having non-directional and directional responses.
Figure 5:
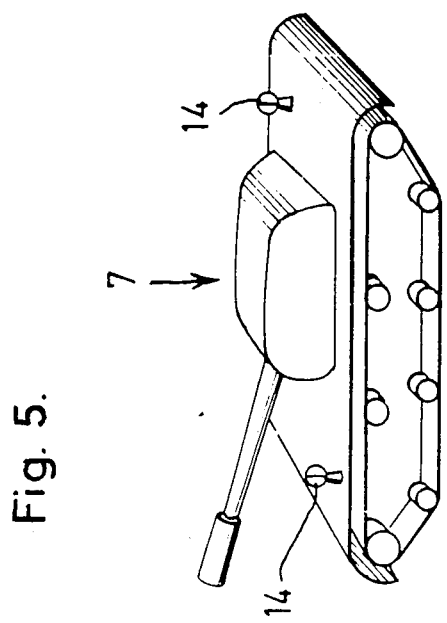
FIG. 5 is a perspective view of a military vehicle equipped with radiation sensors of the invention.

The radiator sensor of FIG. 1 comprises a collector 2 and a detector 6. The collector 2 is in the form of an elongate light-guide fiber comprising a cover or cladding 2a and a core 2b. The fiber is provided in regions of its core and cover with centers 9 for dispersing impinging radiation; the material of the cover is transparent to the infrared region of interest and is preferably substantially opaque at shorter wavelengths of the visible spectrum; the cover material may thus illustratively be an infrared-transmitting glass such as arsenic trisulphide. Since the cover is transparent to the infrared region of interest, the dispersion centers may also be located only in the cover or only in the core of the fiber.

The core 2b has a higher index of refraction than the cover 2a, so that the boundary surface or interface between core and cover provides a total reflector for most of the scattered incident radiation within the core. The fiber 2 therefore acts as a collector for impinging radiation that is locally orthogonal to or approximately orthogonal to the axis of the fiber, and the dispersion centers are the means of coupling a certain percentage of the incident radiation into the core of the fiber, for longitudinal reflected guidance along the fiber. One end of the collector is provided with a mirror layer 10, and the photosensitive layer 11 of the detector 6 is carried at the other end of the collector. A portion of the dispersed light emerges from core 2b when it impinges on the boundary surface at a more oblique angle than the limiting angle for total reflection, which limiting angle is determined by the difference between indices of refraction of the two media 2a and 2b.

FIG. 2 shows a sensor 14 which operates in accordance with the principle shown in FIG. 1 and in which the collector is an optical fiber which is wound as a single-layer on a spherical support 3, with the ends 4 and 5 of the fiber coupled to two detectors 6a and 6b, shown electrically connected in series. In this embodiment, the sensor does not have any direction of preferential response and is thus by itself suitable only for the detection of diffuse radiation. However, when mounted in duplicate to a military vehicle, as at each of the diagonally spaced locations 14 on the tank 7 of FIG. 4, and with the tank turret serving as a radiation shield between the two sensors 14, a degree of directional response is realizable upon comparing the relative intensity of detector output for each of the sensors 14.

Figure 3:
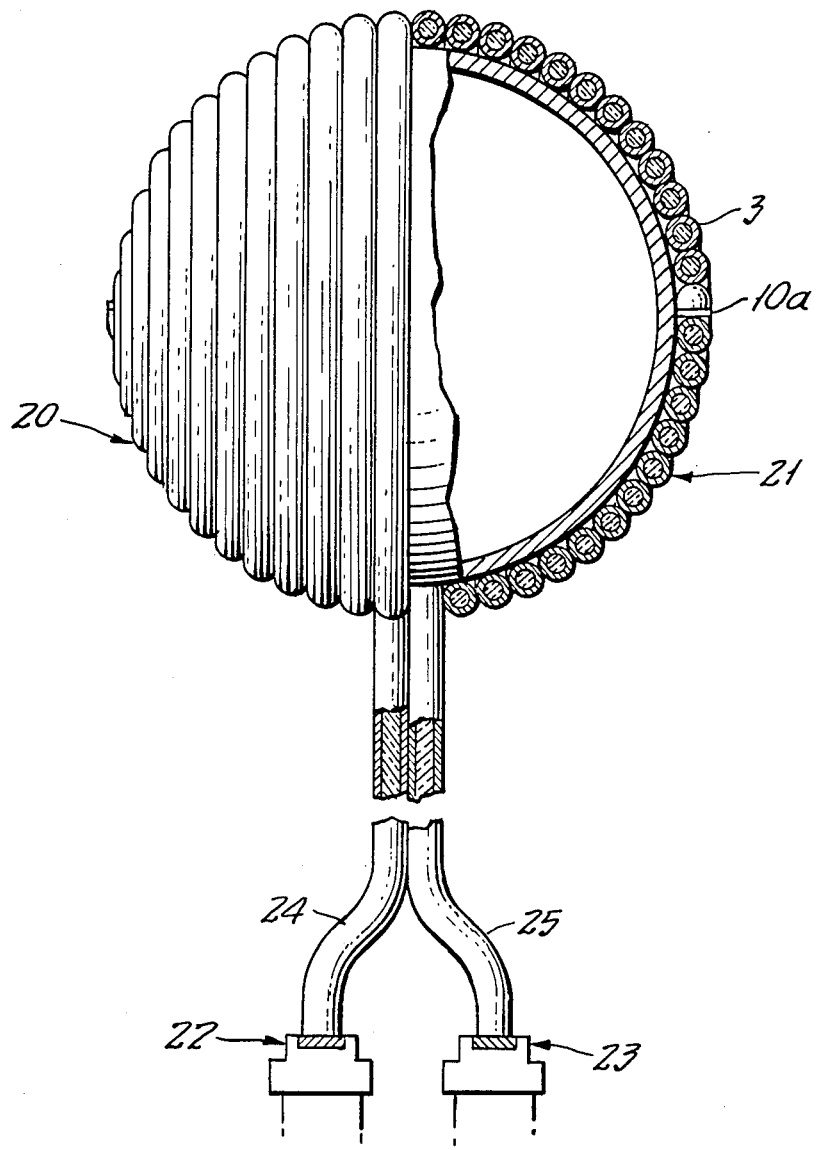

The arrangement of FIG. 3 is very much similar to that of FIG. 2, except that the device comprises two independent sensors 20, 21, each with a detector-connected end 24, 25, wound as separate hemispheres and mounted to opposite halves of the spherical support 3, the parting line between hemispheres being in a vertical plane of support symmetry. Shading for metal as the material of support 3 will be understood to suggest shielding between the two hemispheres, so that the outputs of the separate detectors 22, 23 associated with the respective sensors 20, 21 can be independently and/or differentially evaluated, to provide a rough direction-finding capability. And it will be understood that the spaced mounting of two devices of FIG. 3 can provide further-enhanced direction-finding capability, particularly if the parting-line planes of the respective devices have a quadrature-orientation relationship.

In FIG. 4, the developed cylindrical surface of the support for a four-quadrant collector is designated by 8, and the collector-fiber unit for each quadrant terminates at a different one of four detectors 6c, 6d, 6e, 6f. It will be understood that in mounting such a cylindrical unit to a vehicle, the cylindrical axis should be vertical, so that each of the collector/detector units serves a different azimuthal quadrant.

Optical range-finding systems which measure underwater vehicles operate within the visible spectral range. As and for indicating radiation from these range-finding systems, radiation sensors with fluorescent material would be suitable, as described in said patent.

What is claimed is:

1. A passive warning device for external mounting on a military vehicle for indicating the existence of invisible hostile infrared-sighting radiation which is incident upon the device and therefore incident upon the vehicle to which the warning device is mounted, said device comprising:
   a wound light-guide fiber having a core zone of a material which visibly fluoresces when exposed to invisible infrared radiation;
   an outer zone continuously cladding said core zone, the material of said outer zone being opaque to visble light but transparent to invisible infrared radiation, whereby fluorescent action in said core zone will be not be externally apparent via said outer zone; and
   at least one photodetector for the fluorescent radiation, said photodetector being mounted for response to fluorescent radiation at exit from at least one end of said fiber.

2. The warning device of claim 1, wherein said fiber is wound to the exterior of a supporting body, and means adapting said body for external mounting.

3. A device according to claim 2, characterized by the fact that the supporting body is developed as a sphere (3).

4. A device according to claim 3, characterized by the fact that the supporting body is segmented.

5. A device according to claim 2, characterized by the fact that the supporting body is developed as a cylinder.

6. A device according to claim 5, characterized by the fact that the supporting body is segmented.

7. A device according to claim 1, characterized by the fact that the light-guide fiber (2) is provided with dispersion cores (9) for the impinging radiation.

8. A device according to claim 1, characterized by the fact that the light-guide fiber (2) contains fluorescent material.

9. As an article of manufacture, a passive laser-warning device comprising a support member having an upstanding central axis and providing an external surface peripherally distributed about and at offset from said axis, and at least two continuous light-guide fibers carried by said surface in nested side-by-side array of adjacent fiber courses, said fibers being transparent at least to near-infrared and medium-infrared wavelengths and each fiber being characterized (a) by a core zone and a cladding zone of different refractive index and (b) by dispersion cores for scattering incident radiation within the core in the generally axial direction of the core, said core zone being of a material which visibly fluoresces upon exposure to radiation at said wavelengths, said cladding zone being transparent to near-infrared and medium-infrared wavelengths and opaque to visible light, and a photosensitive detector at at least one end of each light-guide fiber.

10. The article of claim 9, in which said support member has a spherical surface, and in which each of two of said fibers is developed over and carried by a different one of two hemispherical areas of said support member.

11. The article of claim 9, in which said support member has opposed surface areas facing outward from opposite offsets from said axis, and in which each of said fibers is developed over and carried at a different one of said opposed surface areas.

12. The article of claim 9, in which said support member is of a material that is substantially opaque to said wavelengths.

* * * * *